Patented Aug. 5, 1952

2,606,154

UNITED STATES PATENT OFFICE 2,606,154

MINERAL OIL COMPOSITION

Howard D. Hartough, Pitman, N. J., assignor to Socony-Vacuum Oil Company, Incorporated, a corporation of New York No Drawing. Application July 1, 1948, Serial No. 36,450

4 Claims. (Cl. 252—48.2)

The present invention relates to the stabilization of hydrocarbon mixtures, and, more particularly, to the stabilization of hydrocarbon mixtures by incorporation therein of formaldimines.

It has been found that formaldimines effectively stabilize hydrocarbon mixtures to oxidizing agents when added, in amounts ranging from about one part per 5000 to one part per 50 by weight, to the hydrocarbon mixture, particularly petroleum stocks. The lower range of effectiveness as determined in the bubble test would indicate that the formaldimines probably act as a metal deactivator.

A formaldimine is a compound having a composition corresponding to the formula, $RCH_2N=CH_2$ where R is a compound capable of participating in the Mannich reaction. F. F. Blicke has defined the compounds capable of participating in the Mannich reaction as compounds having "at least one hydrogen atom of pronounced reactivity" ("Organic Reactions," volume I, page 304, Wiley (1942)). Blicke enumerates as compounds capable of participating in the Mannich reaction, ketones, aldehydes, acids and esters, phenols, acetylenes, alpha-picolines and quinaldines. The preparation of formaldimines and the isolation thereof has, so far as it is known, not been described prior to the description provided in the copending applications for United States Letters Patent Serial No. 782,962, filed October 29, 1947, now Patent No. 2,577,191, patented Dec. 4, 1951, in the name of Howard D. Hartough and Serial No. 781,754, filed October 23, 1947, in the names of John W. Schick and Howard D. Hartough.

The formaldimines are prepared by reacting a compound, as characterized by F. F. Blicke, "having at least one hydrogen atom of pronounced reactivity" with aqueous formaldehyde solution and ammonium chloride. In general, the reactants were mixed, the reaction mixture warmed to initiate the reaction (the reaction is usually initiated at temperatures of the order of about 70° C.) and maintained at temperatures of about 40° to about 65° C. until the reaction is substantially complete and then cooled to ambient temperatures. The reaction mixture is then neutralized with strong aqueous sodium hydroxide or similar base and the neutralized reaction mixture extracted with a solvent, say ether and the formaldimine recovered in any suitable manner.

When compounds, such as thiophene and thiophene derivatives, having both of the alpha positions unsubstituted, are used as starting materials in the preparations of formaldimines a second compound, also useful in stabilizing hydrocarbon mixtures, is obtained. This second product has a composition corresponding to the formula:

$$H_2C=N-CH_2R-CH_2-N=CH_2$$

where R is a compound having two hydrogen atoms of pronounced reactivity.

EXAMPLE

N - (2 - thenyl)formaldimine prepared as described in copending application Serial No. 782,962 was tested for its effectiveness in the well-known bubble test using an acid refined highly paraffinic oil. The bubble test has been described in U. S. Patent No. 2,361,353 and comprises placing a section of a cadmium-silver alloy surface weighing about 6 grams in about 30 grams of oil and similar sections of the alloy in about 30 grams of the test oil containing various amounts of the material to be tested. The samples of control oil and blends with the alloy sections are heated to, and maintained at about 175° C. for 22 hours while a stream of air is bubbled against the alloy surface. The loss in weight of the alloy section is a measure of the effectiveness of the material being tested. The effectiveness of N-(2-thenyl)formaldimine is indicated by the following tabulation:

Table I

| Percent Weight Concentration of N-(2-thenyl)formaldimine in Test Oil | Inhibited Oil Alloy Loss, Milligrams | Original Oil Alloy Loss, Milligrams |
|---|---|---|
| 0.1 | 0 | 33 |
| 0.05 | 0 | 33 |
| 0.025 | 0 | 33 |
| 0.0125 | 21 | 16 |

In a similar manner a mixture containing about 50 per cent N-(2-thenyl)formaldimine and about 50 per cent di-2,5-(methyleneiminomethyl)thiophene, $H_2C=NCH_2-C_4H_2S-CH$ 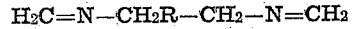 $N=CH_2$, was tested for effectiveness. The mixture is also effective as is manifest from a study of the data presented in Table II.

Table II

| Percent Weight Concentration of Mixture in Test Oil | Alloy Loss, Milligrams |
|---|---|
| 0.1 | 0 |
| 0.05 | 0 |
| 0.025 | 0 |
| 0.00 (blank or control) | 33 |

A highly paraffinic oil of S. A. E. 20 grade and suitable for use as an automotive crankcase oil was used as a blank or control oil and blends containing the concentrations of N-(5-methyl-2-thenyl)formaldimine trimer indicated in the following tabulation subjected to the same bubble test with the results indicated therein. It will be noted that the loss of weight by the bearing under the test conditions decreases with decreasing the concentration of the trimer.

| Percent Weight Concentration in Highly Refined Paraffinic Oil of SAE 20 | Bearing Loss in Milligrams |
|---|---|
| 0.0 | 18 |
| 0.1 | 21 |
| 0.05 | 17 |
| 0.025 | nil |

To further test the effectiveness of N-(2-thenyl)formaldimine and mixtures of N-(2-thenyl)formaldimine and di-2,5-(methyleneiminomethyl)thiophene, the additives in oil were subjected to a catalytic oxidation test. The catalytic oxidation test is performed in the following manner:

Twenty-five milliliters of the oil to be tested are placed in a steam emulsion test tube which has a capacity of 50 milliliters and is graduated in 1 milliliter divisions. Into the test tube are introduced the following catalysts: 15.6 square inches of sandblasted iron of analytical purity; 0.17 square inch of lead; 0.87 square inch of aluminum and 0.78 square inch of polished electrolytic copper. The aluminum is 99 per cent pure and is polished in the same manner as the copper. The iron, copper and aluminum are all washed in A. S. T. M. naphtha and allowed to dry just before being placed in the test tube. Prior to testing, the lead is polished by rubbing with a cloth wet with carbon tetrachloride.

A straight glass air inlet tube is placed in the test tube through the center of the iron coil so that its end, which is beveled to permit the free escape of the air, rests on the bottom of the test tube.

A glass cap, with a hole in it for the air inlet tube, covers the cell. Before a test the glass cap air inlet tube and test tube are placed in a potassium dichromate-sulfuric acid cleaning solution for at least ten minutes, washed with tap water, then with distilled water, and finally dried with acetone to ensure clean test tubes.

The oxidation cell is then filled with the oil or oil blend to be tested and heated to an aluminum-block bath at 260° F. (±1° F.) for forty hours with an air flow through the sample at ten liters per hour.

Dry air enters a manifold system from which it is metered to the samples on test.

At the conclusion of the test the neutralization number, kinematic viscosity, sludge and loss in weight of the lead section are determined. A comparison of the viscosity before test with that after test provides a mathematical value of the increase in viscosity.

N-(2-thenyl)formaldimine and a mixture containing approximately 70 per cent of 2,5-di-(methyleneiminomethyl)thiophene and 30 per cent N-(2-thenyl)formaldimine were subjected to the catalytic oxidation test described hereinbefore. The results are tabulated in Table III.

*Table III*

| Additive | Concentration in Oil, Weight percent | N. N. after 40 hours | Percent Increase in Viscosity after 40 hours | Sludge | Lead Loss in Mg. |
|---|---|---|---|---|---|
| N-(2-thenyl)formaldimine | 1.0 | 5.3 | 29.2 | nil | 228.2 |
| 70% 2,5-di-methyleneimino methyl)thiophene 30% N-(2-thenyl)formaldimine | 1.0 | 1.8 | 10.7 | nil | 61.4 |
|  | 0.25 | 4.5 | 32.2 | nil | 335.6 |
| None [1] |  | 15.0 | 200.0 | nil | 200.0 |

[1] The blank or control was a lubricating oil of paraffinic origin of SAE 10 grade and useful as an automotive crankcase oil. The control oil had an initial viscosity (Saybolt Universal) of 165 seconds at 100° F., 130 seconds at 90° to 94° F., and of 45 seconds at 210° F.

It will be noted that the presence of either the formaldimine alone or the 2,5-di-(methyleneiminomethyl)thiophene improved the resistance of the oil to oxidation.

A highly paraffinic automotive crankcase oil of SAE 10 grade mixed with N-(5-methyl-2-thenyl)formaldimine trimer in concentrations as indicated hereinafter was subjected to the same catalytic oxidation test with the results given in the following tabulation:

*Table IV*

| Per Cent Weight Concentration of Trimer in Paraffinic Oil | N. N. After 40 Hours | Per Cent Increase in Viscosity After 40 Hours | Sludge | Lead Loss in Mg. |
|---|---|---|---|---|
| 1.0 | 0.7 | 4.1 | nil | 18.8 |
| 0.5 | 3.0 | 19.3 | nil | 204.2 |
| 0.25 | 9.8 | 55.0 | nil | 327.6 |
| 0.125 | 9.2 | 80.3 | nil | 511.5 |
| 0.00 (Blank or Control) | 15.0 | 200.0 | nil | 200.0 |

Blends of N-(p-methoxybenzyl)formaldimine trimer in a highly paraffinic oil of SAE 10 grade were subjected to the same catalytic oxidation test with the results tabulated hereinafter.

*Table V*

| Per Cent Weight Concentration of Trimer in Paraffinic Oil | N. N. After 40 Hours | Per Cent Increase in Viscosity After 40 Hours | Sludge | Lead Loss in Mg. |
|---|---|---|---|---|
| 1.0 | 10.5 | 64.5 | nil | 72.6 |
| 0.00 (Control) | 12.5 | 215.0 | nil | 200.4 |

N-(2-thenyl)formaldimine was subjected to the Lauson Oxidation Stability Test.

The Lauson Oxidation Stability Test has as its purpose a determination of oil deterioration as primarily indicated by corrosion of copper-lead bearings and secondarily by engine cleanliness. The Lauson engine is a single cylinder, 4 cycle liquid cooled internal combustion engine using gasoline as fuel, having splash lubrication and a copper-lead bearing. The engine under test conditions is operated with an oil temperature of about 270° F., a cooling jacket temperature of about 212° F., a speed of about 1825 R. P. M. at one half throttle and at a 13.0–1 air-fuel ratio. The test period is about 100 hours and the engine is inspected at intervals of approximately 20 hours. The bearing weight loss, engine cleanliness and used oil analysis (neutralization number, N. N.) are reported for each inspection. A blank oil usually an automotive crank case lubricating oil of paraffinic origin equivalent to an SAE 20 and having a Saybolt Universal viscosity of about 318 seconds at 100° F., and of 55 seconds at 210° F., is subjected to the test and the necessary data obtained. Then the same control oil blend with the additive to be tested is subjected to substantially the same test conditions and the necessary data obtained. The data thus obtained is presented in Table VI.

*Table VI*

| Per Cent Weight Concentration of N-(2-Thenyl) formaldimine | Hours | N. N. | Bearing Loss in Grams | |
|---|---|---|---|---|
| | | | Top | Bottom |
| 1 | 20 | 1.4 | 0.041 | 0.037 |
| | 60 | 1.6 | 0.110 | 0.094 |
| | 100 | 1.7 | 0.136 | 0.111 |
| Blank Oil [1] | 20 | 1.7 | 0.181 | 0.113 |
| | 60 | 3.9 | 0.480 | 0.398 |
| | 100 | 4.8 | 0.646 | 0.557 |

[1] The blank or control oil was a highly paraffinic lubricating oil of SAE 20 grade having a viscosity (Saybolt Universal) of 318 seconds at 100° F., of 147-157 seconds at 130° F., and of 55 seconds at 210° F. and useful as an automotive crankcase oil.

What is claimed is:

1. A mineral oil composition comprising a lubricant fraction of mineral oil and an additive in amount effective to deactivate metal with which said mineral oil composition is in contact, said additive consisting of a formaldimine selected from the group consisting of thenyl formaldimine having a formula $R'C_4H_2SCH_2N=CH_2$, wherein $R'$ is selected from the group consisting of hydrogen, lower alkyl groups, and the group $-CH_2N=CH_2$ and mixtures thereof in which mixtures the $-CH_2N=CH_2$ thenyl formaldimine is the predominant constituent.

2. A mineral oil composition comprising a lubricating fraction of mineral oil and an amount of a formaldimine effective to deactivate metal with which said mineral oil composition is in contact, said formaldimine having the formula $C_4H_3S-CH_2-N=CH_2$.

3. A mineral oil composition comprising a lubricating fraction of mineral oil and an amount, effective to deactivate metal with which said mineral oil composition is in contact, of 2,5-di-(methyleneiminomethyl) thiophene having the formula, $CH_2=N-CH_2-C_4H_2S-CH_2-N=CH_2$.

4. A mineral oil composition comprising a lubricating fraction of mineral oil and at least about 1 weight per cent of a mixture 2,5-di-(methyleneiminomethyl) thiophene having the formula, $CH_2=N-CH_2-C_4H_2S-CH_2-N=CH_2$, and N-(2-thenyl) formaldimine having the formula, $C_4H_3S-CH_2N=CH_2$, in which mixture said 2,5-di-(methyleneiminomethyl) thiophene is the primary constituent.

HOWARD D. HARTOUGH.

No references cited.